United States Patent [19]

Ferren

[11] Patent Number: 4,584,704
[45] Date of Patent: Apr. 22, 1986

[54] SPATIAL IMAGING SYSTEM

[76] Inventor: Bran Ferren, 615 Fireplace Rd., East Hampton, N.Y. 11937

[21] Appl. No.: 585,351

[22] Filed: Mar. 1, 1984

[51] Int. Cl.$^4$ .............................................. G06K 7/10
[52] U.S. Cl. ................................. 382/65; 354/400; 356/3; 358/227; 901/47
[58] Field of Search .................... 358/218, 227; 356/4, 356/16, 3, 8; 343/455, 450; 901/47; 354/400, 403, 404; 382/58, 28, 65; 250/204

[56] References Cited

U.S. PATENT DOCUMENTS

| | | | |
|---|---|---|---|
| 2,969,706 | 1/1961 | Rosier et al. | 356/3 |
| 3,356,792 | 12/1967 | Peters | 358/218 |
| 3,715,161 | 2/1973 | Koeber | 356/3 |
| 3,941,476 | 3/1976 | Stauffer | 356/3 |
| 4,161,756 | 7/1979 | Thomas | 358/227 |
| 4,214,827 | 7/1980 | Tominaga et al. | 354/400 |
| 4,325,082 | 4/1982 | Griesshaber | 358/218 |
| 4,404,594 | 9/1983 | Hannan | 358/227 |
| 4,404,595 | 9/1983 | Ushiro et al. | 358/227 |

Primary Examiner—Leo H. Boudreau
Assistant Examiner—Joseph Mancuso
Attorney, Agent, or Firm—Darby & Darby

[57] ABSTRACT

A spatial imaging system includes a variable focus lens for scanning a visual field. The depth of field of the lens system is narrow relative to the range of the field to be scanned so that visual in-focus image planes of the entire field can be obtained as the focal plane is scanned in range. Detection of in-focus objects may be accomplished by converting the scanned image of each plane into electrical signals which can be filtered or otherwise discriminated to identify in-focus areas. The individual image planes may be stored in memory and processed to provide information of interest regarding the objects within the field of view. Such information may include identification, detection, color, shape, etc. and it exists in machine-usable form.

21 Claims, 9 Drawing Figures

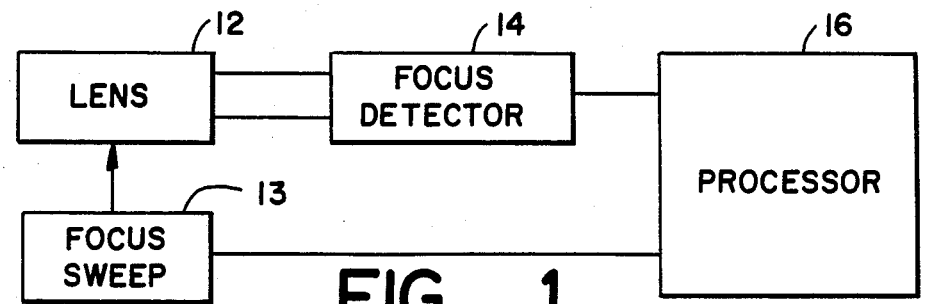
FIG _ 1
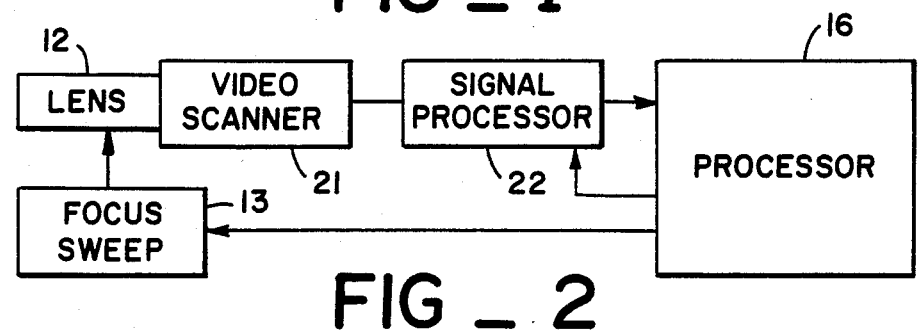
FIG _ 2
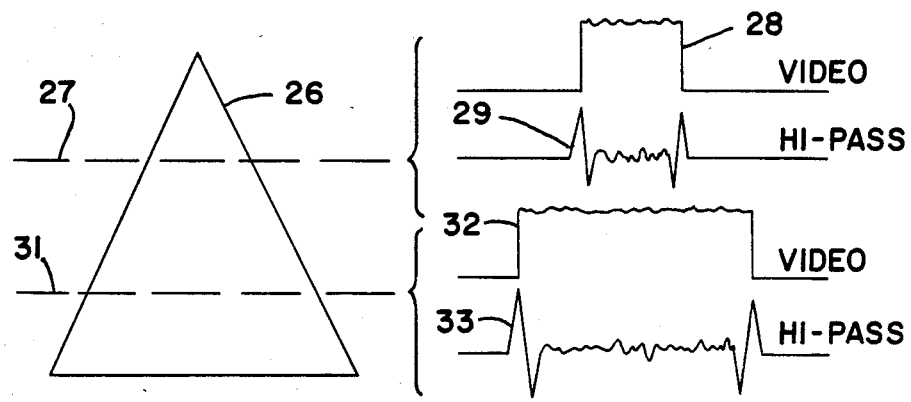
FIG _ 4
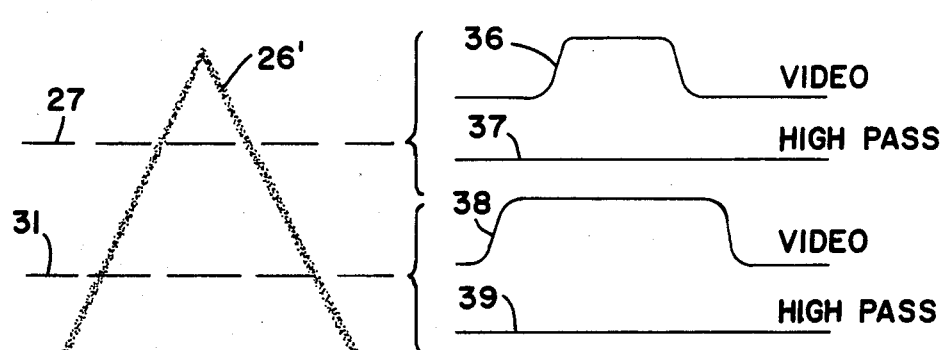
FIG _ 5

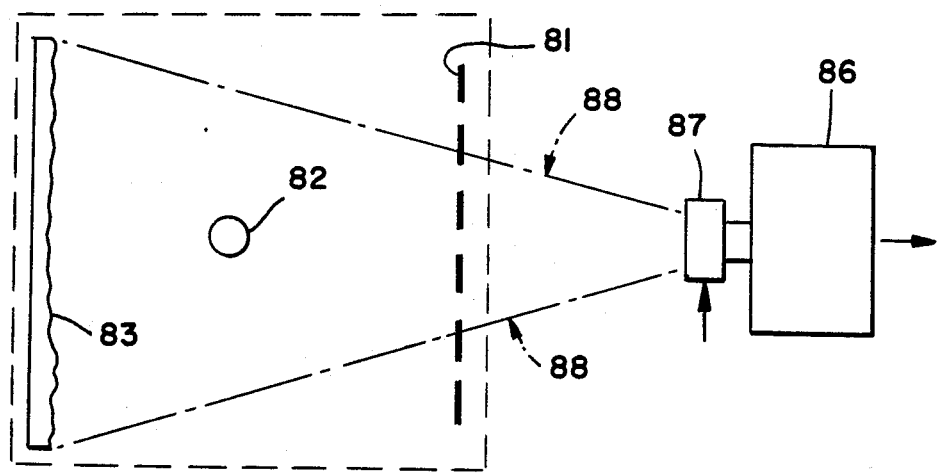
FIG_6
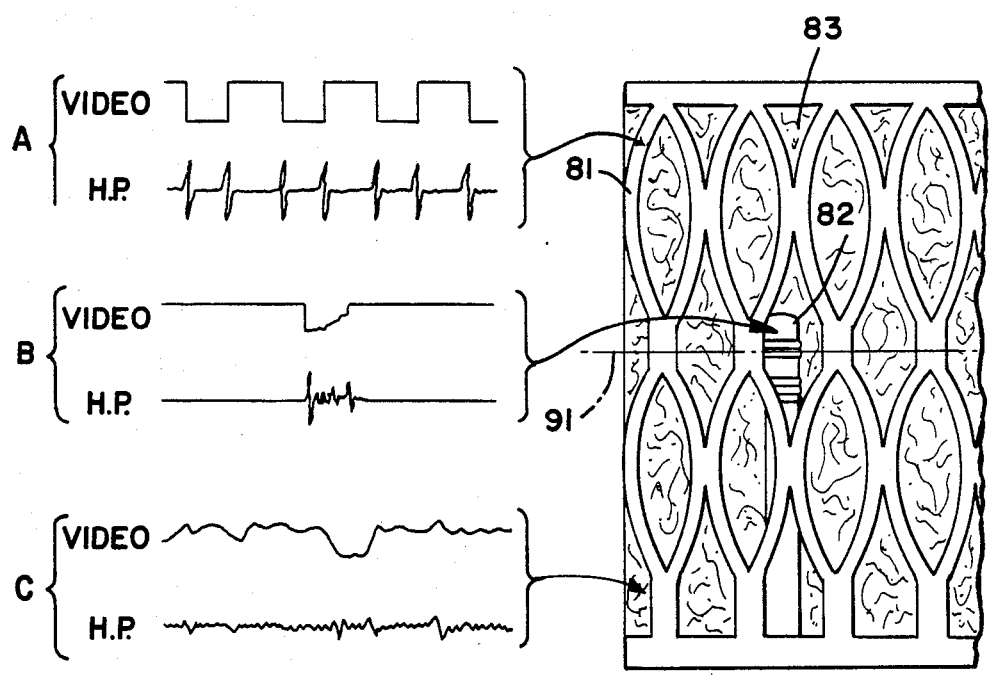
FIG_7

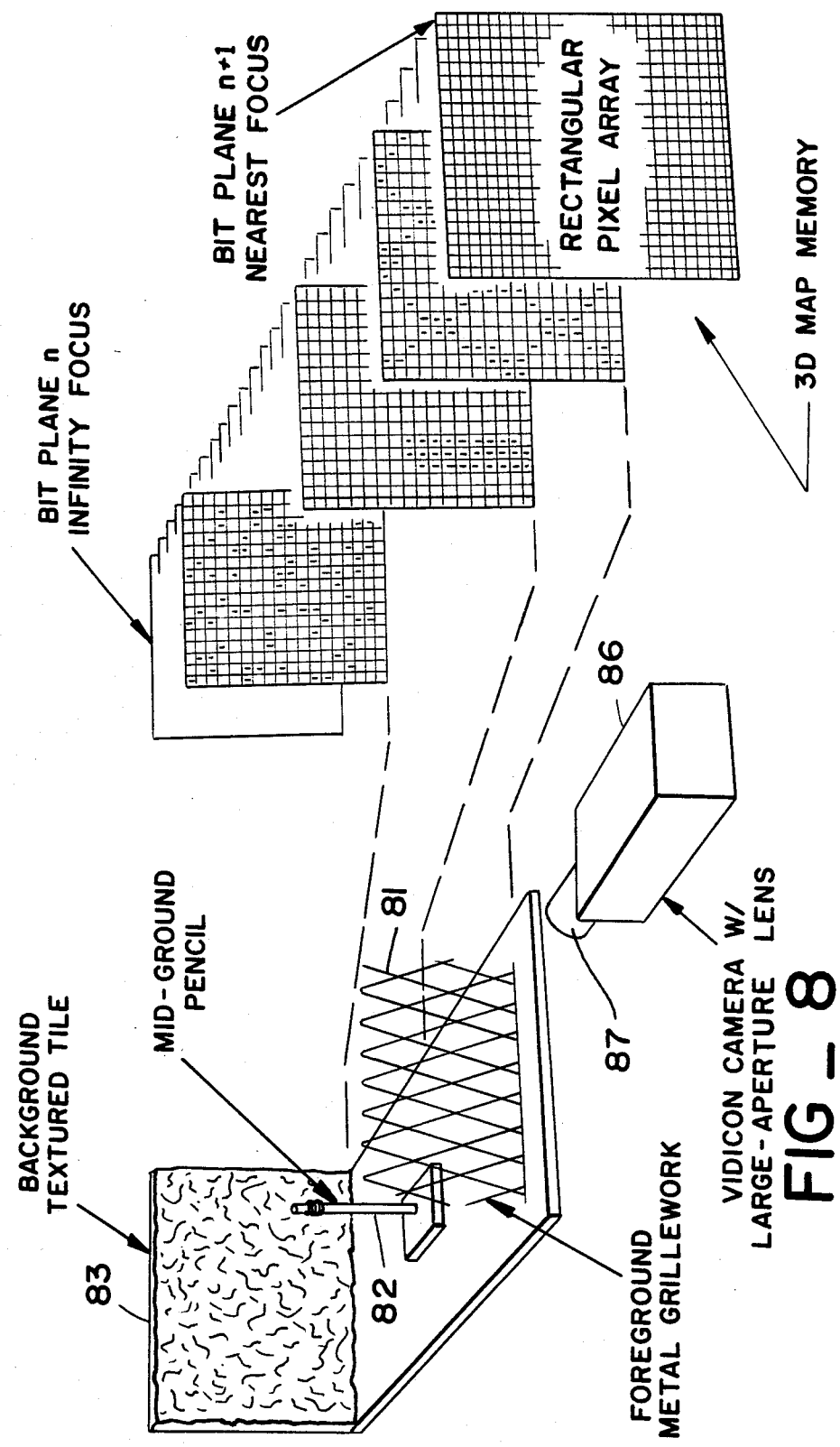

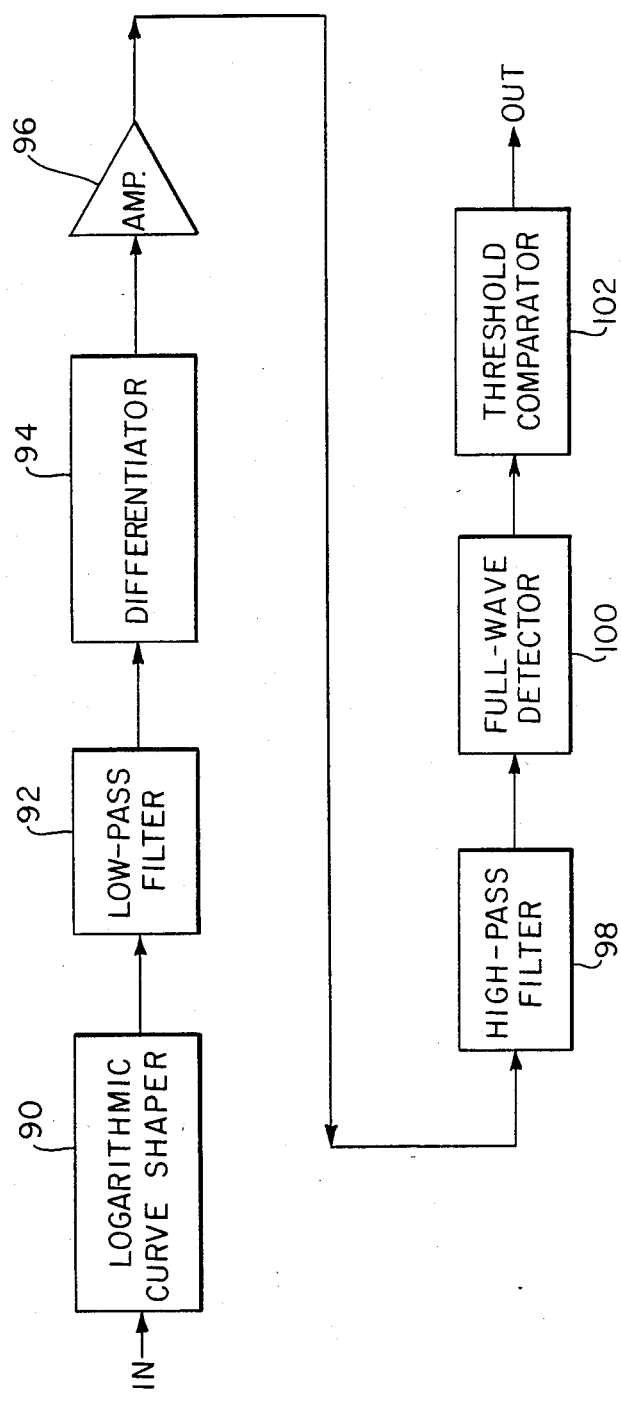

SPATIAL IMAGING SYSTEM

The present invention relates to devices and methods for obtaining three-dimensional visual information in a machine usable form.

BACKGROUND OF THE INVENTION

There are various applications in which a machine is to be controlled by information derived from a visual scene. For example, in the field of robotics, it may be desirable for a robotic arm to be able to select an item from a bin. If the robot is provided with a visual capability (e.g. a camera system), the robot must be able to process the information derived from the camera in such a way that the arm can be moved in three dimensions to recognize and/or enegage a selected item. There are many other applications where it is desired to obtain three-dimenional visual information in a form which can be used by a machine, such as a computer, for control, identification or detection purposes (among others). Non-robotic uses for such information include computer assisted manufacturing and/or design systems, security systems, collision avoidance systems, guidance systems and range finders. There are innumerable other situations where reliable three-dimensional visual information can be used advantageously.

The prior art has encountered substantial problems in attempting to provide machine usable information corresponding to a three-dimensional field. In practice, adjacent and/or interleaved information in the visual field may represent objects that are widely displaced in range so that separation of information from different objects becomes quite difficult. If it were possible to determine the range of each object in the visual field it would then be possible to greatly simplify the separation of objects. To date the complexity of computations in existing systems has precluded real-time operation in all but very simple vision fields. Auto focus systems for cameras are not applicable as a solution to this problem.

A number of different approaches for obtaining three-dimensional ranging data are being or have been investigated as generally noted below.

A binocular vision system employs two separate camera units having correlated outputs so that the relative displacement of image coincidence may be located or identified. An enormous amount of computation is required so that the system is quite slow and costly. Many other problems such as unreliable ranging of repetitive patterns also exist.

Structured lighting may be employed to project grids or the like on a subject from different angles while one or more cameras record the images. In such a system, images are post processed to obtain depth information and, while less analysis is required than in the above-noted binocular correlation, moving objects cannot be processed and the system is impractical for substantial vision field volumes or under normal illumination. Difficulty is also encountered in illuminating concave surfaces of objects in a vision field.

Attempts have also been made to employ a scanned pencil beam of light such as a laser beam over a vision field. The difficulties of this system are substantially the same as the structural lighting system noted above except that normal lighting may be employed, however such a system is very slow.

The present invention provides three-dimensional (3D) visual recognition which is faster and less costly than that available with known prior art techniques.

In addition, the present invention has a better response to complex target images and moving targets without critical mechanical alignment requirements as compared to the known prior art.

An important feature of the invention resides in the capability of providing "adaptive" (programmable) control of various optical and electronic parameters to aid image processing. Some of these adaptively controlled functions may include focus, focal length, effective aperture (depth of field), electronic filtering, optical filtering, spatial-temporal light modulation, pattern recognition and memory plane loading. Data produced in accordance with the invention can be analyzed for characteristics such as shape, color, texture, plane orientation, geometric motion, and range, among others.

SUMMARY OF INVENTION

In accordance with the invention, a variable focus lens is used to scan a visual field. The depth of field of the lens system is narrow relative to the range of the field to be scanned so that visual in-focus "slices" of the entire field can be obtained as the object focal plane is scanned in range. Detection of in-focus objects may be accomplished by converting the scanned image of each plane into electrical signals which can be filtered (risetime analyzed) or otherwise discriminated to identify in-focus areas. Since each slice corresponds to a determinable range of the entire field, range information can be made conveniently available for any desired purpose. In a preferred embodiment, the individual slices are converted into a digital representation of the visual scene and stored in a bit mapping memory. Such information may then be readily used by an image processing computer to derive the desired visual information (e.g. range, shape, orientation, color, etc.) of each object in the field.

BRIEF DESCRIPTION OF FIGURES

FIG. 1 is a block diagram of a basic system in accordance with the present invention;

FIG. 2 is a block diagram of an electronic embodiment of the system of FIG. 1;

FIGS. 4 and 5 are schematic representations of video and corresponding high frequency signals resulting from a single line scan of an object in focus and out of focus;

FIG. 6 is a plan view of an object in a sample field of view of the present invention;

FIG. 7 is a front or camera view of the objects in the field of view of FIG. 6 together with wide band video and high frequency signals (after high pass filtering) for a single line scan at foregrounds, midground and background of the field of view of FIG. 6;

FIG. 8 is a perspective view of the layout of FIG. 5 and including a representation of a bit plane map memory generated by the present invention; and FIG. 9 shows schematically a preferred technique for detecting in-focus images.

DETAILED DESCRIPTION

Figure 3:
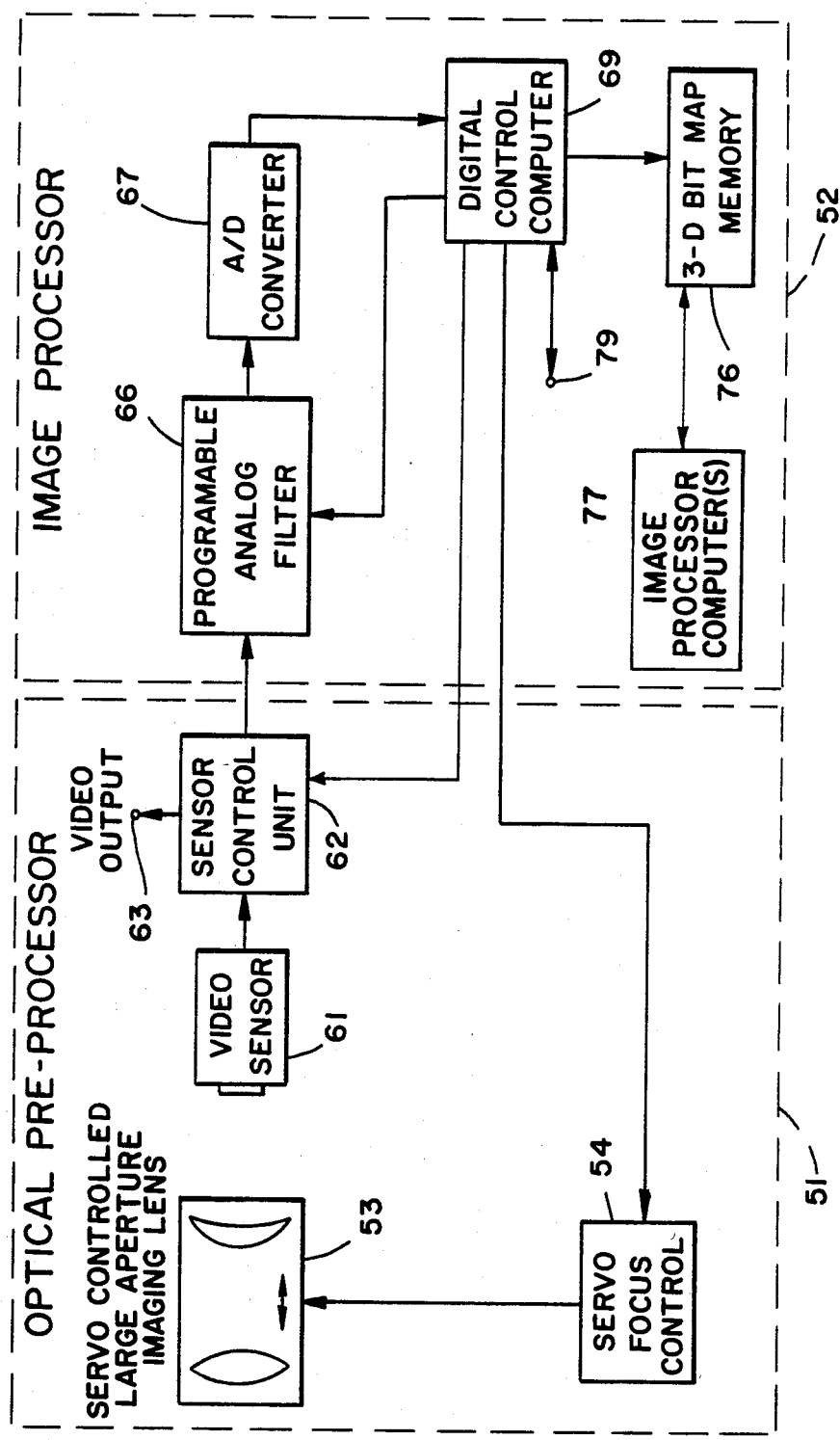
FIG. 3 is a simpified block diagram of an optical preprocessor and image processor as may be employed in implementing the system of FIG. 2.

A lens system having a very shallow depth of field (e.g. a large aperture optical system) will produce an image wherein only an object or a portion thereof substantially lying in the focal plane will be in focus. All other objects or portions of objects in the field of view will be out of focus to varying degrees. The present invention provides for scanning the focal plane (focus) of such a lens system so as to produce a plurality of images at successively different ranges (focal distances). Each of these images will only sharply present the object (or portion thereof) in focus at the distance to which the lens is focused and means are employed to detect the regions that are in focus in each successive image plane.

As used herein, the term "shallow depth of field" is intended to refer to a depth of field which is shallow relative to the entire range of the scene to be scanned. For example, if a range of many thousands of feet is to be scanned, a lens system with a depth of focus measured in feet or larger may be sufficiently "shallow" for purposes of the invention. Conversely, when dealing with ranges measured in centimeters, a shallow depth of focus will typically be measured in terms of millimeters. The invention is not restricted in terms of range and, as will become more apparent from the following description, it is only necessary that the depth of focus be shallow enough to discriminate objects with whatever resolution is desired.

The present invention may be employed with many different forms of radiant energy such as infrared, X-rays, electrons, radio waves, ultrasonic and the like. For purposes of explanation, it is herein described with respect to an optical system operating in the range of visual light.

FIG. 1 shows a lens system 12 which may comprise a large aperture variable focus optical system having a shallow depth of field. The lens system may employ refractive optics (lenses), reflective optics (mirrors or catadiptic, fixed or variable geometry), or hybrid optics (maksukov cassagranian). Means are provided to step or sweep the depth of focus over a range encompassing a desired field of view (i.e. the visual scene). Various focussing means may be employed such as variable displacement or geometry reflective and/or refractive optical elements, or multi-layer detectors, i.e. detectors with sensitive areas on multiple planes perpendicular to the optical axis of the imaging lens. This lens system is adapted to be directed toward a field of vision wherein objects are to be identified (for example). The focal plane of this lens or imaging system is periodically swept through a near to far range, or vice versa, by a focus sweep servo 13 so that different thin planes of the field of vision or object space will be in focus at successive time intervals during the sweep cycle. Hereinafter, for purposes of explanation, these thin planes are referred to as "image planes". The successive images produced by the lens of imaging system 12 are applied to a focus detector 14 for detecting the regions for each image that are in sharp focus. This focus detector 14 produces signals representative of the "in-focus" portions of each successive image plane as the focus of the lens system 12 is swept in range, and the detector signals are applied to a processor 16. This processor may include a computer and associated equipment for receiving, storing and utilizing the information provided by the present invention. The focus sweep servo 13 and processor 16 are interconnected so that the successive in-focus portions of successive image planes are related to lens focal distance (focus) and, therefore, the range of each image.

FIG. 2 shows a block diagram of an electronic implementation of the basic system of FIG. 1, wherein the lens system 12 is connected to a video scanner 21. This scanner 21 may comprise a conventional raster scanned vidicon camera which produces successive line scans across the field of view from top to bottom or vice versa. The video signal from the video scanner 21 is applied to a signal processor 22. This signal processor 22 discriminates between signals derived from "in-focus" areas and those derived from "out-of-focus" areas. This may be accomplished by employing a frequency selective electrical signal processing means and a preferred manner of signal processing is further discussed below. The output of the signal processor 22 (i.e. the in-focus video signal) is applied to a processor 16 which in turn is connected to a focus sweep servo 13 for varying the focus of the lens system 12. Considering a conventional video signal, for example of the type used in commercial television, the output of signal processor 22 can be regarded as representing a sequence of frames with each frame containing only in-focus video information. Each frame may correspond to a single image plane. Since the scanning rate of the lens system 12 is known, it is a simple matter to correlate the in-focus video information with the range of the various image planes.

The output of the signal processor is fed to the processor 16 which may process this now three-dimensional video information in many different ways. The actual processing of the information does not form a part of this invention and therefore is not described in detail. Generally speaking, in the case of collision avoidance or surveillance systems, the processor may need only recognize the presence of an object somewhere in the field of vision and its range. For such purposes, storage of the three-dimensional video information may not be necessary. In the case of robotics (for example) where it is desired to provide three-dimensional vision in a machine usable form, the processor 16 may include storage means so that the information can be analyzed from various perspectives. This is explained in further detail with reference to FIGS. 3 and 8.

FIGS. 4 and 5 graphically illustrate operation of the system shown in FIG. 2 and described above. In FIG. 4 a triangle 26 represents a triangular object in an image plane of the lens system 12. This triangle is in-focus and a line scan 27 across an upper portion of the triangle will produce a video signal 28 at the output of video scanner 21 having an increased amplitude, as indicated, over a width equal to the width of the triangle 26 at the line scan 27. Passing this video signal through a high-pass filter will produce signals as indicated at 29 wherein two high-frequency spikes appear representing the initiation and termination of the high amplitude video pulse 28. These high-pass signals 29 may be discriminated to remove all but the spikes which then identify the edges of the triangle 29 at the line 27. Similarly, a line scan 31 through a lower portion of the triangle 26 will produce a video pulse 32 having a high amplitude pulse having a width equal to the width of the triangle along the line 31 and passage of this video signal though a high-pass filter will produce high pass signals 33 again having spikes, as indicated, at the initiation and termination of the video pulse 32. Comparing the high-pass signals for the line scan 27 and line scan 31, i.e., high pass signals 29 and 33, shows that these signals accurately identify the edges of the triangle 26 at the vertical position of the scan lines. Of course, a large plurality of scan lines are employed so that the resultant high pass signals positively identify the outline of the triangle 26. As explained below, instead of edge detection alone, the entire "window" of in-focus video information may be passed by the signal processor 22 to processor 16.

Reference is now made to FIG. 5, particularly in comparison to FIG. 4. There is illustrated at the left of FIG. 5 an image plane containing an out-of-focus triangle 26' with scan lines 27 and 31 thereacross as in FIG. 4. The scan 27 will produce a video signal 36 having a pulse width generally related to the width of the triangle at the line 27 but having sloping edges (slower rise time) because of the lack of sharp contrast between the triangle and background thereof. Passing this vide signal 36 through a high-pass filter will produce a high-pass signal as shown at 37 wherein there are no major spikes and discrimination of this high-pass signal 37 will produce no output signals. The same is true for the scan 31 wherein a somewhat wider video pulse 38 results but also having sloped edges so that its passage through a high-pass filter produces a high-pass signal 39 having no substantial variations or spikes. Consequently, discrimination of this high-pass signal will also produce a zero output.

The significance of the foregoing as described with reference to FIGS. 4 and 5 is that for each image plane of the lens system there will be produced output signals only identifying objects sharply in focus therein. This then removes the problem of overlapping or apparent interleaving of objects in a field of view (at different distances from the imaging system) by establishing the range of each of a large plurality of successive in-focus images and thus of the objects in the field of view.

FIG. 3 illustrates in further detail one manner of implementing the present invention. The system shown in FIG. 3 may be regarded to include an optical pre-processor 51 and an image processor 52 as represented by dotted lines. Pre-processor 51 includes a servo-controlled large aperture imaging lens 53 having a variable focus controlled by a servo focus control 54 which operates to sweep the focus from near to far, or vice versa, in a field of vision of the lens. Devices usable for this purpose are known. Successive images from the lens 53 are viewed by a video sensor 61 (e.g. a vidicon camera) which produces video signals that are applied to a sensor control unit 62. The sensor control unit 62 is a conventional device which controls the scanning of the video sensor 61 and, additionally, suitably processes the signal output of the video sensor. The video output at terminal 63 may be monitored on a standard video display, for example, by viewing a selected focal plane in which in-focus and out-of-focus information appears.

The video output of the sensor control unit 62 is fed to a rise time detector and/or filter 66 which may be programmed by a digital (or analog) control computer 69 to select the desired in-focus images. The rise time detector and filter 66 may function exclusively as an edge detector or it may function with other circuitry to present a "window" of video information (between in-focus edges) for image processing. By controlling the selectivity of the rise time detection through control of frequency and amplitude, the sensitivity and resolution of the device can be modified. In other words, the filter 66 may be programmed to respond to different degrees on in-focus information. For example, for fine detail work, the filter 66 may respond only to very sharply focused images in the various image planes. Where large fields are being scanned, it may be desirable to detect less sharply focused images. All of this can be controlled by the computer 69. This capability is useful in analyzing object texture information as an aid to object recognition.

As mentioned above with respect to FIG. 2, the output of the filter 66 is a video signal containing such information as the in-focus portions of each of the image planes. It is necessary to correlate the image planes to the scanning rate and/or position so that the range information can be used. Therefore, it is desirable to convert the video signal from filter 66 to a digital form which is usable by digital computers. This is accomplished by the analog to digital converter 67 which also may be of conventional design and which, therefore, produces digital signals representing the aforementioned in focus video information. Since the digital control computer 69 is controlling the scan rate of servo 54, it is a simple matter for the computer 69 to "tag" each frame of video information from analog to digital converter 67 with a suitable digital representation identifying relevant information such as signal processor mode and/or the position or range of each individual image plane. The techniques for so identifying individual frames of video information are well-known and, therefore, are not described in detail herein. The digital control computer 69 also applies an output to an I/O port 79 which may interface with such devices as robotics controls or additional computers and may also receive signals therefrom for application and sending instructions to the digital control computer.

The techniques for storing the video information (where desired) may be conventional. In the simplest type of storage system, each image plane may be considered to comprise a multiplicity of individual storage elements in which a binary signal can be stored. The presence of a data bit may represent darkness and the absence of a bit may represent brightness for a particular area of a video screen so that a "map" of the display can be stored. If the map stored only two bits for each position, the device would be capable of only displaying black and white. If it were desired to store gray values, an additional storage element for each bit position would be required to indicate the gray scale. Likewise, and also in accordance with known techniques, color (wavelength) information for each of the individual discrete display positions can be stored.

Furthermore, in practice only those image planes in which an in-focus image is detected will be stored. In a typical scan thousands of individual image planes may be viewed. In the vast majority of cases, many if not most of these image planes will contain no in-focus image. Hence, there is no reason to store the video signals from these blank image planes. Accordingly, in practice it is contemplated that the computer will cause only those image planes in which in-focus information appears to be fed to the three-dimensional bit map memory 76. Each image plane in which in-focus information appears will be "tagged" by the computer with range information and one or more of the adaptive (programmable) features of the system. For example, such adaptive information may include depth of field, filter parameters, wave length, and scanning rate. Hence, when it is desired to analyze the stored information, all of the relevant information regarding the visual image is available.

There are numerous ways in which the information stored in the bit map memory 76 can be employed to provide three-dimensional information. In FIG. 3, an object identifier is shown generally at 77. The object identifier may comprise a computer which reads the information stored in memory 76 sequentially by frame (e.g. image plane) to provide range information for identification and/or detection purposes. In the case of robotics, the object identifier 77 may provide feedback information for interaction between the robot and the objects in the field of view. For many purposes, the object identifier 77 may read the stored image planes in memory sequentially, but in more complex operations, it may be desirable for each memory plane to be associated with one or more object identifier all of which are under control of a single control computer. Such systems will enable very rapid processing of the stored visual information and more complex manipulation of the stored image data. Communication between the digital computer 69 and the object identifier 77 may also be provided so that instructions for adaptive control can be transferred between the two.

While the present invention has been described above with respect to a preferred embodiment, it is helpful to consider a simple test setup employing the invention and illustrating the results obtained.

FIGS. 6, 7 and 8 relate to an experimental laboratory setup in which the basic principles of the invention were demonstrated. The setup includes a metal grillwork 81 in the foreground with a post such as a pencil 82 behind the grillwork in midground and a textured tile 83 forming the background behind the pencil 82. This setup is viewed by a vidicon camera 86 having a large aperture lens 87 (e.g., 105 mm, f/1.4), the focal distance of the lens being varied while the image at successive focal planes is scanned.

The visual scene in FIG. 8 was set with respect to the vidicon camera 86 such that the grillwork 81 was about three feet from the camera and the background textured tile 83 about eight feet from the camera. The variable focus lens 87 scanned the visual scene in about two seconds and each focal plane was scanned at conventional video scanning rates, e.g. about thirty frames (memory planes) per second or about sixty frames for a single scan of the entire field. A field of view of the lens 87 is indicated by the dashed lines 88 and FIG. 7 illustrates the view from the camera 87. In this setup, the heavy metal grillwork 81 partially masks the pencil 82 and that the tile 83 may be seen through the openings in the grillwork. Conventional systems would find it difficult to provide real-time intelligible information regarding the physical location and shape of the midground pencil with respect to the background tile and the foreground grillwork; however, the present invention is capable of providing full information as to the configuration and location of each of the objects.

Waveforms A of FIG. 7 represent video signals and high-pass signals resulting from high-pass filtering of the video signals for the foreground of the field of view, i.e., the metal grillwork 81. These signals are obtained from one scan line 91 laterally across the focal plane at the foreground of the field of view. At B of FIG. 7 there is shown the video signal of this same scan line 91 on a focal plane at the midground of the field of view and identifying the post or pencil 82 located thereat. There is also shown the same signal after passing through a high-pass filter. At C of FIG. 7 there is shown a video signal on the same scan line 91 of a focal plane in the background of the field of view comprising the textured tile 83. Passage of this signal through a high-pass filter produces a continuous interval during which a sustained level of high frequency signal information occurs; this is due to the texture contrast in the area of the tile.

The high-pass signals exemplified in FIG. 7 are discriminated to eliminate low level variations and are then converted to digital signals.

The digital signals produced by the present invention may be stored in a 3-D bit map memory as schematically illustrated in FIG. 8. As illustrated in this figure of the drawings, the present invention effectively produces "pictures" of a field of view at successive ranges so that three-dimensional vision is provided.

FIG. 9 is a block diagram showing the signal processing filter used in conjunction with the test setup of FIGS. 6–8. The processing filter of FIG. 9 is an edge detector although, as mentioned above, other processing techniques for sensing in-focus information can be employed.

The incoming signal to the signal processor of FIG. 9 is the output of the video sensor 61 (for example) shown in FIG. 3. This signal is coupled to a logarithmic curve shaper 90 which expands the scale of the video signal at the lower end to make it easier to distinguish between in-focus and out-of-focus video signals in the area of interest. The output of the logarithmic curve shaper or log expander 90 is coupled to low pass filter 92 which in the experimental example, comprised a two-pole Butterworth low pass filter with a corner frequency of 1.2 MHz. The function of the filter 92 is to eliminate high frequency noise components in the video signal.

The output of filter 92 is coupled to a differentiator 94 which produces a spike or pulse when the in-focus edge is detected. The output or pulse from differentiator 94 is amplified by amplifier 96 and passed through a high pass filter 98 which performs the essential discrimination between the in-focus and out-of-focus video information. In the test setup, filter 98 comprised a three pole Bessel (linear phase) filter with a corner frequency of 750 KHz.

The output from the high pass filter 98 is passed through a full wave detector 100 which in effect demodulates the filter output to produce a signal when in-focus information is present. The detector output is coupled to a threshold comparator 102 which produces an output only when the signal from detector 100 exceeds a predetermined threshold, selected to indicate the presence of the sharply focused edge signal.

There are numerous different ways in which the in-focus information can be detected by the signal processing filter. In addition to the edge detection arrangement of FIG. 9, filters having computer controlled band pass characteristics can be used. Characteristics of such filters may be controlled by voltage-tuned filters, clock-rate tuned charged coupled device (CCD) filters, or high speed digital signal processors. Multi-band (simultaneous) analyzers may be employed using any of the aforementioned techniques or surface acoustics wave (SAW) devices. Also contemplated is interline analysis using video line storage in CCD's with appropriate comparison circuits to extract edge and texture information in a direction perpendicular to the scan. Other techniques as well may be employed and the invention is not restricted to any specific technique for detecting the in-focus video information.

There are obviously many ways in which a scene of interest may be scanned for depth. In some cases, it may be desirable to scan large increments using a relatively wide depth of field and then diminish the scanning interval as well as the depth of field when an object is detected. Such parameters can readily be controlled by the computer 69 which will also keep accurate track of the range information despite changes in scanning rates and depth of field.

Scanning of the successive focus planes of the lens 53 may be accomplished in a variety of ways including electronic and/or mechanical. The manner of scanning is dependant upon the type of radiation employed, i.e., x-ray, infra-red, microwave, RF, ultraviolet, acoustic, ultrasonic and the like. Such scanning is known in the art. Specifically, refracting optical lenses may be focussed by displacing the entire lens (or selected elements) along the optical axis. Systems containing reflective elements may be focussed by translation or deformation of the mirror surface. Electronic beam systems may be focussed magnetically or by varying the electrical potentials applied to certain electrodes. The lens should have a range variation equal to a desired depth of a field of view which for some applications may vary from millionths of an inch (in a microscopic embodiment) to a few inches to a few feet and in other instances may vary from thousands of feet to other thousands of feet. For robotics applications, it is normally sufficient to provide a maximum focal distance of the order of some feet. The video sensor or detector of the present invention may, for example, comprise vidicons, SIT vidicons, rectangular CCD arrays and single point or linear detector arrays with mechanical scanning (providing a 360° horizontal viewing angle) or hybrid mechanical-electronic scanning. Various known techniques for maximizing circuit operation and minimizing circuit complexity may be employed.

Where electronic scanning is used, as in the case of vidicon camera, changes in scanning techniques may be desirable. For example, when scanning horizontally as in a conventional vidicon camera, the sensitivity of the device to in-focus horizontal surfaces is diminished simply by virtue of the fact that a horizontal line will be intersected fewer times during a single frame than a vertical line. To increase the sensitivity of the optical system to horizontal surfaces, the camera may be turned at a 45° angle (for example), in which case there is equal sensitivity to both horizontal and vertical surfaces (which ordinarily occur most frequently), and diminished sensitivity only to lines at a 45° angle. Instead of using raster scanning, vector scanning may be used to facilitate image processing.

The optical preprocessor 51 may incorporate optical processing techniques to aid in pattern isolation and image classification by imposing various patterns in a transform or imaging plane of the lens system 53 (e.g. between lens elements). Such patterns may be fixed or animated (e.g., static or film patterns, or active spatial-temporal light modulators) and possibly be wave length selective. The lens system may also incorporate special fixed or variable focus length optics such as a macro or zoom lens to control the field of view and image and field size. These parameters such as (in the case of a zoom lens) focal length may also be under adaptive control by the digital control computer 69 or by other external means. In addition, wavelength or color analysis may be incorporated in the optical preprocessor by employing multi-spectral detectors, optical filters sequentially imposed, prisms, scanned gratings, or other wavelength analyzer techniques.

What is claimed is:

1. A fully automatic method of providing spatial imaging information relating to objects in a field of view, comprising:
continually varying the focus of a variable focus lens system to scan said field at a predetermined rate thereby to provide a multiplicity of image planes covering the scanned field, said lens system having a depth of field shallow relative to the field to be scanned, and
detecting in-focus images of said objects as said field is scanned; and
determining the location of each of the in-focus images relative to the entire field of view as said field is being scanned to provide three-dimensional spatial imaging information.

2. The method of providing spatial imaging information according to claim 1, further including the step of identifying at least one of the objects in the field of view being scanned based on said in-focus images.

3. A method of providing spatial imaging information according to claim 2, further including the step of identifying the location of said one object within said field of view based on the determined location of the corresponding in-focus image.

4. A method of providing spatial imaging information according to claim 1, further including the step of processing the in-focus images to provide image data regarding said objects.

5. A method of providing spatial imaging information according to claim 4, wherein said processing step includes the step of storing in memory at least the in-focus images and information identifying the positions of such in-focus images relative to the field.

6. A method of providing spatial imaging information according to claim 4, wherein the rate at which said field is scanned is variable.

7. A method of providing spatial imaging information according to claim 4, wherein the depth of field of said lens system is variable.

8. A method of providing spatial imaging information according to claim 4, wherein only selected in-focus characteristics of said objects are detected.

9. Apparatus for providing spatial imaging information relating to objects in a three-dimensional field, comprising:
a lens system having a depth of field shallow relative to the range of said field;
means for continually varying the focus of said lens system to scan said field in range,
means responsive to said lens system for detecting each of the image planes scanned by said lens system containing an in-focus image, said means for detecting operating continuously as said field is scanned in range; and
means responsive to said detecting means for determining the positions of said image planes relative to said field of view to provide three-dimensional spatial imaging information.

10. Apparatus according to claim 9, further including image processing means responsive to said detecting means for detecting and/or identifying pre-selected characteristics of the objects within said field.

11. Apparatus according to claim 10, wherein said means for detecting in-focus portions of images comprises a scanned detector for converting an image into electrical signals varying in proportion to the image at sequential points on a scan path and signal processing means for discriminating between signals from in-focus portions and signals from out-of-focus portions.

12. Apparatus according to claim 11, wherein said means for determining includes an analog-to-digital converter operating upon said signals from in-focus portions of images to produce digital signals, means for storing said digital signals and means for analyzing such stored signals.

13. Apparatus according to claim 12, wherein said means for storing comprises a memory for storing said digital signals in memory planes corresponding to at least those image planes of said lens system which contain in-focus information.

14. Apparatus according to claim 11, wherein said signal processing means comprises frequency selective means.

15. Apparatus according to claim 14, wherein said frequency selective means includes a rise time detector and filter.

16. Apparatus according to claim 15, further including means for changing the frequency characteristics of said rise time detector and filter to thereby vary the sensitivity of the system to in-focus images.

17. Apparatus according to claim 10, further including means for varying the rate which the focus of said lens system is varied.

18. Apparatus according to claim 10, further including means for varying the depth of field of said lens system.

19. Apparatus according to claim 10, including optical pre-processor means in conjunction with said lens system and said video sensor for selecting optically processing characteristics of said objects to be processed by said image processor.

20. Apparatus according to claim 10, including means for varying the focal length of said lens system.

21. A three-dimensional vision system comprising:
a variable focus imaging lens system having a shallow depth of field,
focus control means connected to said lens system and focusing said system at successive focal planes of successively different ranges,
a video scanner responsive to said lens system for producing electrical video signals having amplitudes related to light intensity of each image produced by said lens system at said successive focal planes,
a high pass filter connected to receive said electrical video signals and passing only high frequency components thereof representing edges and texture of in-focus portions of each image, and
computer means connected to receive edge and texture information of said high frequency signals and connected to said focus control means for correlating said edge information to the range of successive focal planes for producing a three-dimensional representation of a field of view of said lens system.

* * * * *